UNITED STATES PATENT OFFICE.

ALEXANDER P. ASHBOURNE, OF PHILADELPHIA, PENNSYLVANIA, ASSIGNOR TO THE DESICCATED COCOANUT AND OIL MANUFACTURING COMPANY, (LIMITED,) OF PENNYSLVANIA.

TREATING AND REFINING COCOANUT-OIL.

SPECIFICATION forming part of Letters Patent No. 356,398, dated January 18, 1887.

Application filed May 27, 1886. Serial No. 203,492. (No specimens.)

*To all whom it may concern:*

Be it known that I, ALEXANDER P. ASHBOURNE, a citizen of the United States, residing in the city and county of Philadelphia, State of Pennsylvania, have invented a new and useful Improvement in Treating and Refining Cocoanut-Oil, which improvement is fully set forth in the following specification.

My invention consists in the treatment of cocoanut-oil for medicinal, toilet, and other purposes, whereby the same retains its freshness and sweetness, and is not liable to become rancid.

In carrying out my invention I take a sufficient quantity of cocoanut and carefully pare and grate or pulverize the same. The meat is placed in a steamer or other suitable vessel, and subjected to heat for about two hours. To each one hundred pounds of the steamed meat I add six gallons of boiling water—desirably, condensed or soft spring water—and boil the same for two hours, frequently stirring the mass. The mass is next placed in a bag and subjected to a powerful pressure, while yet hot, until it is perfectly dry, the effect of which is the removal of the oil from the meat, the same appearing as a white liquid. The oil is now placed in a copper boiler and brought to a gentle boil until it gathers a head, and the oil is then separated from the water and skimmed and placed in a porcelain-lined kettle, and again boiled for two hours, when the coarse matters settle at the bottom, leaving clear oil at the top. The latter is drawn off and placed in another glazed kettle and refined, as follows: To each gallon of the oil I add five table-spoonfuls of white sugar, the shells of two eggs, one-half ounce of alum, and three ounces of table-salt, and the mass is gently boiled for one hour and a half, and when cool it is ready for use, and may be bottled, as desired. A suitable condenser is placed over the kettle to collect and condense the vapor of the boiling mass.

I am aware that it is not new to prepare cocoanut-oil by first steaming the prepared meat, then boiling the same in water, and subjecting the mass inclosed in a bag to pressure, afterward boiling the white liquid thereby obtained until the oil separates from the water, and again boiling the oil. Neither is it new to refine the oil by a mixture of white sugar, the whites and shells of eggs, and alum. Such a method of treatment is old and well known to me, being the subject-matter of Letters Patent No. 230,518, granted to me July 27, 1880, and such is not herein claimed; but the method now described differs from the one in the said patent in several essential features, which are believed to be marked improvements thereon, as by the same a purer oil is obtained. In the present-described method I steam the prepared meat about the one-half of the time only before boiling that I did in the old matter. I also, for boiling purposes, use fifty per cent. more water and boil for a much longer time. This difference in treatment tends to release more of the oily matter from the fibrous tissue of the meat. I also use soft water in this matter. Another difference, and one of importance, is in the refining-mixture, the whites of eggs being omitted in the present process and salt being added. The action of the salt in combination with the alum and sugar has an improved effect upon the foreign matter in the oil, and hastens the clarifying of the same.

Having thus described my invention, what I claim as new, and desire to secure by Letters Patent, is—

1. The process of treating cocoanut-oil, consisting in steaming or boiling cocoanut-meat and separating the oil therefrom, and finally refining the oil by means of sugar, eggs, alum, and salt, substantially as set forth.

2. The improved method of preparing cocoanut-oil, consisting of first preparing the meat of the nut, substantially as described, next steaming the same, and then boiling it in soft water, next subjecting the mass to pressure, boiling the white liquid obtained thereby and separating the oil from the water, then boiling the pure oil, and finally refining the same by a mixture of sugar, egg-shells, alum, and salt in the proportions described, all substantially as described.

ALEXANDER P. ASHBOURNE.

Witnesses:
JOHN A. WIEDERSHEIM,
A. P. GRANT.